3,013,054
2-METHOXY-3,6-DICHLOROBENZOATES
Sidney B. Richter, Chicago, Ill., assignor to Velsicol Chemical Corporation, Chicago, Ill., a corporation of Illinois
No Drawing. Filed Aug. 4, 1958, Ser. No. 753,112
12 Claims. (Cl. 260—473)

This invention relates to the production of herbicidal compositions of matter. More specifically, this invention relates to compounds of the formula

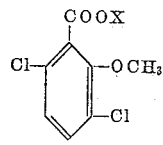

in which X is hydrogen, ammonium, an alkali metal, substituted ammonium, an alkyl radical, or a substituted alkyl radical. Thus, when X is hydrogen, the compound is 2-methoxy-3,6-dichlorobenzoic acid. This heretofore unknown chemical compound and its derivatives as cited above have extraordinarily great activity as herbicides useful for the destruction of undesirable plant life.

2-methoxy-3,6-dichlorobenzoic acid can be obtained readily in good yield from 1,2,4-trichlorobenzene in a three-stage process. The trichlorobenzene is converted in excellent yield to 2,5-dichlorophenol by treatment with methanol and sodium hydroxide. The 2,5-dichlorophenol is then treated with carbon dioxide under pressure to give 2-hydroxy-3,6-dichlorobenzoic acid, which can be converted to the desired 2-methoxy-3,6-dichlorobenzoic acid either by treatment with methyl sulfate or by treatment with methyl iodide-silver oxide reagent.

Although 2-hydroxy-3,6-dichlorobenzoic acid can be converted to 2-methoxy3,6-dichlorobenzoic acid by the use of methyl iodide-silver oxide reagent, the present invention provides an improved process for the preparation of the desired 2-methoxy-3,6-dichlorobenzoic acid. Methyl iodide-silver oxide reagent is an expensive reagent, particularly since about 2 moles of silver oxide is used in the reagent to methylate each mole of the hydroxy compound satisfactorily.

In the present process, however, the preparation of 2-methoxy-3,6-dichlorobenzoic acid is effected readily, economically, and in good yield by treatment of the 2-hydroxy-3,6-dichlorobenzoic acid as its alkali metal salt with dimethyl sulfate. The reaction is carried out in aqueous solution, which is prepared by treating each mole of 2-hydroxy-3,6-dichlorobenzoic acid with at least 2 moles of an alkali metal hydroxide dissolved in water. Alkali metal hydroxides such as sodium or potassium hydroxide are suitable. Although the reaction can be effected satisfactorily with a minimum of 2 moles of alkali metal hydroxide for each mole of hydroxy compound, it is desirable to use an excess of the alkali metal hydroxide. The alkali metal salt of the hydroxybenzoic acid has limited solubility in water, and the use of an excess of up to about 5 moles of alkali metal hydroxide, for example, for each mole of the hydroxybenzoic acid enhances solubility and avoids the use of large volumes of water. A ratio of about 4 moles of alkali metal hydroxide to each mole of 2-hydroxy-3,6-dichlorobenzoic acid is preferred.

The 2-hydroxy-3,6-dichlorobenzoic acid in aqueous solution as its alkali metal salt is treated with a minimum of 1 mole of dimethyl sulfate for each mole of the starting compound. In practice, the use of an excess of dimethyl sulfate is preferred. The compound dimethyl sulfate decomposes slightly in water, which makes somewhat less than the amount initially employed actually available for the reaction. Similarly, some esterification of the carboxylic acid group takes place while the primary reaction of methylation of the hydroxy group is being effected. Thus an excess of dimethyl sulfate is suitably used, equivalent to up to about 5 moles of dimethyl sulfate for each mole of 2-hydroxy-3,6-dichlorobenzoic acid. A ratio of about 4 moles of dimethyl sulfate to each mole of starting compound is preferred.

The dimethyl sulfate is suitably added to the reaction mixture in a constant stream, in portions, or dropwise as is most convenient for the particular apparatus in use. During the addition, it is desirable to maintain the reaction temperature at from about 10° to about 100° C., with external cooling if necessary. Although the process of the invention can be carried out satisfactorily at the upper ranges of reaction temperature indicated, improved yields are obtained by working at the lower temperatures. Reaction temperatures in the range from about 20° to about 50° C. are preferred during the process of adding the dimethyl sulfate. The reaction is satisfactorily carried out at atmospheric pressure, although super atmospheric pressures can be used if desired.

After addition of all the dimethyl sulfate, the reaction mixture is heated at reflux temperature to complete the reaction. The actual time required to complete the reaction depends on a variety of factors, such as the temperature during the addition of dimethyl sulfate, the rate of addition, alkalinity of the solution, and the like. The reaction is ordinarily complete in a few hours. The reaction mixture is then treated with a fresh aqueous solution of alkali metal hydroxide and again refluxed for several hours to hydrolyze any carboxylic acid ester which may have formed as a competing reaction during the formation of the methyl ether. About one-half mole of alkali metal hydroxide is suitably used for each mole of dimethyl sulfate used in the reaction.

The cooled reaction mixture is then acidified to Congo red indicator, and the precipitated acid is filtered off. Although the crude acid so obtained is suitable for many herbicidal uses as such, it can be purified if desired. In a typical purification process, for example, the acid is dissolved in diethyl ether, and the ether solution is dried over a drying agent such as magnesium sulfate before it is filtered and the ether is removed by distillation. The residue is washed with cold pentane and then dried, as in a vacuum oven, to give the crystalline solid 2-methoxy-3,6-dichlorobenzoic acid, which can be further purified by recrystallization from pentane.

The compounds in which X is ammonium, alkali metal, substituted ammonium, or an alkyl group can be prepared readily from the free acid. Thus, X can be made ammonium by treatment of the free acid with ammonium hydroxide, whereupon the product will be ammonium 2-methoxy-3,6-dichlorobenzoate. Similarly, X can be made alkali metal by treatment of the free acid with bases, such as the hydroxides, of alkali metals. Treatment of the acid with sodium hydroxide thus gives sodium 2-methoxy-3,6-dichlorobenzoate as the product, while the use of potassium hydroxide gives potassium 2-methoxy-3,6-dichlorobenzoate.

Compounds in which X is substituted ammonium are amine salts of 2-methoxy-3,6-dichlorobenzoic acid and are prepared by the addition of the free acid to various amines. Typical amines which can be used to prepare such amine salts are dimethylamine, trimethylamine, triethylamine, diethanolamine, triethanolamine, isopropylamine, morpholine, and the like. The resulting products are, respectively, the dimethylamino, trimethylamino, triethylamino, diethanolamino, triethanolamino, isopropylamino, and morpholino salts of 2-methoxy-3,6-dichlorobenzoic acid.

Compounds in which X is an alkyl group or a substituted alkyl group are esters of 2-methoxy-3,6- dichlorobenzoic acid and are prepared by the condensation of the acid with various alcohols. Thus the condensation of methyl alcohol with 2-methoxy-3,6-dichlorobenzoic acid gives the desired ester, methyl 2-methoxy-3,6-dichlorobenzoate. Other typical alcohols which can be used are propyl, isopropyl, n-butyl, sec-butyl, isobutyl, tert.-butyl, amyl, hexyl, heptyl, octyl, nonyl, decyl, and the like. The products are the corresponding alkyl esters of 2-methoxy-3,6-dichlorobenzoic acid. Although such complex esters as those prepared by the esterification of 2-methoxy-3,6-dichlorobenzoic acid with butoxyethanol, propyleneglycolbutylether and the like are useful products in accordance with this invention, preferred esters are those in which X is an unsubstituted alkyl group which contains from 1 to 10 carbon atoms. The condensation of the acid with the alcohol is carried out suitably in an inert solvent such as an aromatic hydrocarbon and in the presence of a few percent by weight of an acid catalyst such as p-toluenesulfonic acid. The water which forms during the esterification reaction can be removed continuously from the reaction mixture by distillation as it forms, and its volume can be measured to determine when the esterification is complete. The ester is then isolated by distillation of the inert solvent.

For practical use in controlling undesirable plant life, the compounds of this invention are formulated and applied in the manner known to the art. For example, these compounds can be formulated into dusts by combining them with such inert substances as talc or clays, and in this form they are dusted directly on the plants it is desired to destroy. The compounds can also be dissolved in organic solvents such as kerosene or the methylated naphthalenes. They can also be emulsified or suspended in water by the addition of emulsifiers or wetting agents. The liquid formulations of these active herbicidal compounds are either applied directly to the plants to be controlled by spraying, or the soil in which the plants are growing can be treated. Other substances such as activators, synergists, spreaders, and adhesives can be added to the formulations if desired.

The specific manner in which the compounds of this invention can be prepared and utilized is illustrated in the following examples:

EXAMPLE I

*Preparation of 2,5-dichlorophenol*

1,2,4-trichlorobenzene (250 g.; 1.4 moles) and sodium hydroxide (250 g.; 6.3 moles) were dissolved in 1100 cc. of methanol, and the solution was charged into a rocking bomb of 4-liters capacity. The solution was heated in the sealed bomb at 190° C. for 4 hours, during which time the pressure in the bomb rose to 600 p.s.i. The reaction mixture was removed from the cooled bomb, and the residual solid sodium salt of the phenol was dissolved in hot water, and the solution was filtered. The combined aqueous and methanolic solutions were then acidified with hydrochloric acid, whereupon an oil separated which was taken up in ether. Drying of the ether solution over magnesium sulfate, filtration, and removal of the ether in vacuo produced an oily residue which on distillation under 2 mm. pressure gave 200 g. (90% of theory) of a yellow oil boiling at 70° C. The oil solidified on standing to yellowish-white, solid 2,5-dichlorophenol having a melting point of 57° C.

EXAMPLE II

*Preparation of 3,6-dichlorosalicylic acid*

2,5-dichlorophenol (200 g.; 1.2 moles) prepared as described in Example I was dissolved in a solution of potassium hydroxide (73 g.; 1.2 moles) in 50 ml. water. The solution was added to 1.5 liters of xylene, and the mixture was heated to remove the water azeotropically. When the last of the water was removed, the salt of the phenol went into solution.

The solution was then placed in a 1-gallon capacity autoclave fitted with stirring apparatus, and the autoclave was pressured to 500 p.s.i. with carbon dioxide. The mixture was then heated and stirred at 130 to 140° C. for 8 hours. On cooling and opening of the autoclave, the potassium salt of the product was present as a solid admixed with a xylene solution of unreacted phenol. The salt was dissolved in hot water, and the solution was filtered and acidified with hydrochloric acid to give a white precipitate, which was filtered and pressed dry to give 73 g. (42% of theory based on phenol utilized) of 3,6-dichlorosalicylic acid having a melting point of 183° C.

EXAMPLE III

*Preparation of 2-methoxy-3,6-dichlorobenzoic acid*

3,6-dichlorosalicylic acid (210 g.; 0.87 mole) prepared as described in Example II was dissolved in a solution of sodium hydroxide (139 g.; 3.48 moles) in 900 ml. water. The solution was cooled to 20° C., and dimethyl sulfate (219 g.; 1.74 moles) was added to the vigorously stirred solution. The mixture was stirred for 20 minutes while the temperature was maintained below 35° C. by ice-cooling. Another portion of dimethyl sulfate (139 g.) was added, and the mixture was stirred for 10 minutes while the temperature was maintained below 45° C. The mixture was then refluxed for 2 hours, treated with a solution of 69.6 g. (1.74 moles) of sodium hydroxide in 250 ml. water, and refluxed for an additional 2 hours. The cooled reaction mixture was acidified to Congo red with hydrochloric acid. The precipitated solid was filtered, dissolved in ether, dried over magnesium sulfate, and filtered. Removal of the ether in vacuo gave a viscous oil, which when dried to a solid at room temperature in a vacuum oven, washed with cold pentane and again dried gave 125 g. (65% of theory) of a pale yellow solid melting at 113 to 115° C. Crystallization of the solid from pentane give white crystals of 2-methoxy-3,6-dichlorobenzoic acid melting at 114 to 116° C.

$C_9H_6Cl_2O_3$:

Calculated—C, 43.47; H, 2.74; Cl, 32.09. Found—C, 43.41; H, 2.80; Cl, 31.88.

EXAMPLE IV

*Preparation of 2-methoxy-3,6-dichlorobenzoic acid at an elevated temperature*

3,6-dichlorosalicylic acid (207 g.; 1.0 mole) is dissolved in a solution of potassium hydroxide (112 g.; 2.0 moles) in 1000 ml. of water. The solution is heated to reflux (about 100° C.) and stirred vigorously while dimethyl sulfate (631 g.; 5.0 moles) is added dropwise. The reaction mixture is then treated with a solution of potassium hydroxide (140 g.; 2.5 moles) in 250 ml. of water and refluxed for an additional 2 hours. The cooled reaction mixture is then acidified to Congo red with hydrochloric acid to precipitate the desired 2-methoxy-3,6-dichlorobenzoic acid, which is purified as described in Example III.

EXAMPLE V

*Preparation of 2-methoxy-3,6-dichlorobenzoic acid at a low temperature*

3,6-dichlorosalicylic acid (207 g.; 1.0 mole) is dissolved in a solution of sodium hydroxide (200 g.; 5.0 moles) in 2000 ml. of water. The solution is stirred vigorously and cooled to a temperature of 10° C. by means of an ice-salt bath. Dimethyl sulfate (126 g.; 1.0 mole) is then added dropwise to the reaction mixture at such a rate that the temperature rises above 10° C. only momentarily. After all the dimethyl sulfate has been added, the reaction mixture is then allowed to come to room temperature and is heated to reflux at which temperature it is stirred vigorously for 2 hours. A solution of sodium hydroxide (20 g.; 0.5 mole) in 250 ml. water is added, and the reaction mixture is refluxed an additional 2 hours. 2-methoxy-3,6-dichlorobenzoic acid is then isolated from the cooled reaction mixture as described in Example III.

EXAMPLE VI

*Preparation of sodium 2-methoxy-3,6-dichlorobenzoate*

2-methoxy-3,6-dichlorobenzoic acid (116 g.; 0.5 mole) is dissolved in 500 cc. of methanol and treated with a solution of sodium hydroxide (20 g.; 0.5 mole) in 100 cc. of methanol. The methanol is removed by distillation in vacuo on the steam bath, and the solid residue is slurried with 100 cc. of cold dry ether, filtered, pressed dry, and dried completely in a vacuum oven to give the desired salt, sodium 2-methoxy-3,6-dichlorobenzoate.

EXAMPLE VII

*Preparation of ammonium 2-methoxy-3,6-dichlorobenzoate*

Treatment of 2-methoxy-3,6-dichlorobenzoic acid (116 g.; 0.5 mole) in 500 cc. of methanol with 34 cc. of commercial concentrated ammonium hydroxide according to the method given in Example VI gives the desired salt, ammonium 2-methoxy-3,6-dichlorobenzoate.

EXAMPLE VIII

*Preparation of the dimethylamine salt of 2-methoxy-3,6-dichlorobenzoic acid*

2-methoxy-3,6-dichlorobenzoic acid (116 g.; 0.5 mole) is dissolved in 500 cc. of dry ether and treated with dimethylamine (22.5 g.; 0.5 mole). The solid which separates is filtered, washed twice with 100 cc. portions of cold ether, filtered, pressed dry, and dried completely in a vacuum oven to give the desired dimethylamine salt of 2-methoxy-3,6-dichlorobenzoic acid.

EXAMPLE IX

*Preparation of the diethanolamine salt of 2-methoxy-3,6-dichlorobenzoic acid*

In the manner described in Example VIII, 2-methoxy-3,6-dichlorobenzoic acid (116 g.; 0.5 mole) is treated with diethanolamine (52.5 g.; 0.5 mole) in 500 cc. of dry ether. The product which is isolated is the diethanolamine salt of 2-methoxy-3,6-dichlorobenzoic acid.

EXAMPLE X

*Preparation of the morpholine salt of 2-methoxy-3,6-dichlorobenzoic acid*

2-methoxy-3,6-dichlorobenzoic acid (116 g.; 0.5 mole) is treated with morpholine (43.5 g.; 0.5 mole) in 500 cc. of ether, and the product is worked up as described in Example VIII to give the desired morpholine salt of 2-methoxy-3,6-dichlorobenzoic acid.

EXAMPLE XI

*Preparation of methyl 2-methoxy-3,6-dichlorobenzoate*

2-methoxy-3,6-dichlorobenzoic acid (116 g.; 0.5 mole), methyl alcohol (16 g.; 0.5 mole), and 3.0 g. of p-toluenesulfonic acid are dissolved in 500 ml. of benzene, and the solution is placed in a 1 liter, round-bottomed flask fitted with a reflux condenser and a calibrated Dean-Stark tube. The solution is heated at reflux temperature until 9 cc. of water have been collected in the Dean-Stark tube. The cooled reaction mixture is then extracted twice with 50 cc. portions of 10% sodium carbonate solution, washed once with water, dried over anhydrous sodium sulfate, and filtered. The benzene is then distilled off in vacuo on the steam bath, and the residue is distilled in vacuo to give the desired ester, methyl 2-methoxy-3,6-dichlorobenzoate.

EXAMPLE XII

*Preparation of decyl 2-methoxy-3,6-dichlorobenzoate*

In the manner and apparatus described in Example XI, 2-methoxy-3,6-dichlorobenzoic acid (116 g.; 0.5 mole) and normal primary decyl alcohol (79 g.; 0.5 mole) are refluxed in 500 ml. of benzene in the presence of 3.0 g. of p-toluenesulfonic acid until 9 cc. of water have been distilled from the reaction mixture. Work-up of the reaction mixture as described in Example IX gives the desired ester, decyl 2-methoxy-3,6-dichlorobenzoate.

EXAMPLE XIII

*Preparation of iso-butyl 2-methoxy-3,6-dichlorobenzoate*

The reaction of 2-methoxy-3,6-dichlorobenzoic acid (116 g.; 0.5 mole) and iso-butyl alcohol (37 g.; 0.5 mole) by the method described in Example XI is used to prepare the ester.

EXAMPLE XIV

*Preparation of an emulsifiable concentrate of 2-methoxy-3,6-dichlorobenzoic acid*

The following concentrate is prepared by mixing the ingredients intimately in the given percentage proportions by weight:

| | Percent |
|---|---|
| 2-methoxy-3,6-dichlorobenzoic acid | 25 |
| Antarox A-400 | 40 |
| Methanol | 35 |

"Antarox A-400" is the trade name under which a non-ionic detergent of the aromatic polyethylene glycol ether type is sold. The above concentrate is diluted with water to the desired concentration for use.

EXAMPLE XV

*Preparation of an emulsifiable concentrate of iso-butyl 2-methoxy-3,6-dichlorobenzoate*

The following ingredients are mixed thoroughly in the given percentage proportions by weight:

| | Percent |
|---|---|
| Iso-butyl 2-methoxy-3,6-dichlorobenzoate | 59 |
| Triton X-100 | 5 |
| Xylene | 10 |
| Kerosene | 26 |

"Triton X-100" is the trade name under which an emulsifier of the alkyl aryl polyether alcohol type is sold. The above concentrate is diluted with water to the desired concentration for use.

EXAMPLE XVI

*Preparation of a dust from sodium 2-methoxy-3,6-dichlorobenzoate*

The following dry ingredients are ground together in the given percentage proportions by weight in a mechanical mixer until a homogeneous mixture is obtained:

| | Percent |
|---|---|
| Sodium 2-methoxy-3,6-dichlorobenzoate | 25 |
| Talc | 75 |

The resulting dust is suitable for hand or machine dusting on plants.

The herbicidal activity of chemical compounds is often demonstrated by the ability of the chemicals to kill or arrest the growth of tomato plants. The tomato plant is readily grown and maintained under uniform conditions for experimental purposes in greenhouses, and its response to chemicals is very similar to that observed for a wide variety of economically important species of undesirable plant life in the field.

The herbicidal activity of the compounds of this invention was demonstrated in greenhouse experiments on young potted tomato plants (Bonny Best variety). The compound 2-methoxy-3,6-dichlorobenzoic acid, for example, was formulated into a 10 percent wettable powder and dispersed in water at a concentration of 2,000 parts per million actual chemical. Ten milliliters of an aliquot portion of the dispersion was added to the soil surface of the tomato plants, approximately 5 to 7 inches tall. In order to avoid undue concentration or accumulation of the chemical in any given area, 5 holes the size of a pencil and about 1 inch deep were punched in the soil surface around the shoot, and the 10 milliliter application was divided equally among the 5 holes. Three plants were used for each application. The treated plants were held under greenhouse conditions for 7 days, provided with subterranean watering, and observed for response to treatment. At the end of the test period, all the plants treated with 2-methoxy,3,6-dichlorobenzoic acid were dead, whereas untreated plants used for a control were completely normal. The root structure of the treated plants was one-eighth normal, again compared to the root structure of untreated plants grown under the same conditions.

Similarly marked herbicidal activity was noted in foliage treatment experiments. 2-methoxy-3,6-dichlorobenzoic acid, for example, was formulated into a 10 percent wettable powder, dispersed in water at a concentration of 2,000 parts per million actual chemical, and applied to the foliage of 4-week-old potted tomato plants (Bonny Best variety) by dipping therein. Three replicates were used for each treatment. The treated plants were held under greenhouse conditions for 7 days, provided with subterranean watering, and observed for response to treatment. At the end of the test period, all the plants treated with 2-methoxy-3,6-dichlorobenzoic acid were dead and had root structures only one-eighth normal compared to untreated plants.

I claim:

1. A compound selected from the group consisting of 2-methoxy-3,6-dichlorobenzoic acid, its alkali metal salts, its ammonium salt, its morpholine salt, its alkyl amine salts in which the amine component is an unsubstituted alkyl amine of up to six carbon atoms, its alkanol amine salts in which the amine component is an unsubstituted alkanol amine of up to six carbon atoms, its esters in which the esterifying group is an unsubstituted alkyl group of from one to ten carbon atoms, and its butoxyethanol ester.

2. An alkali metal salt of 2-methoxy-3,6-dichlorobenzoic acid.

3. An alkyl amine salt of 2-methoxy-3,6-dichlorobenzoic acid in which the amine component is an unsubstituted alkyl amine of up to six carbon atoms.

4. An ester of 2-methoxy-3,6-dichlorobenzoic acid, in which the esterifying group is an unsubstituted alkyl group of from one to ten carbon atoms.

5. 2-methoxy-3,6-dichlorobenzoic acid.

6. Sodium 2-methoxy-3,6-dichlorobenzoate.

7. The diethanolamine salt of 2-methoxy-3,6-dichlorobenzoic acid.

8. n-Butyl 2-methoxy-3,6-dichlorobenzoate.

9. Iso-propyl 2-methoxy-3,6-dichlorobenzoate.

10. The butoxyethanol ester of 2-methoxy-3,6-dichlorobenzoic acid.

11. An alkanol amine salt of 2-methoxy-3,6-dichlorobenzoic acid in which the amine component is an unsubstituted alkanol amine of up to six carbon atoms.

12. The dimethylamine salt of 2-methoxy-3,6-dichlorobenzoic acid.

References Cited in the file of this patent

UNITED STATES PATENTS

| | | |
|---|---|---|
| 2,394,916 | Jones | Feb. 12, 1946 |
| 2,577,969 | Jones | Dec. 11, 1951 |
| 2,624,752 | Morris et al. | Jan. 6, 1953 |
| 2,669,580 | Long et al. | Feb. 16, 1954 |
| 2,724,643 | Morris et al. | Nov. 22, 1955 |
| 2,726,947 | Baumgartner | Dec. 13, 1955 |
| 2,847,462 | Sieger | Aug. 12, 1958 |
| 2,848,470 | Girard et al. | Aug. 19, 1958 |

OTHER REFERENCES

Ullman et al.: Chem. Abst., Vol. 1, pages 846–7 (1907).

Zincke in "Chemical Absts.," Vol. 6, 1912, page 1753.

Hirwe in "Prac. Indian Acad. Sci.," Vol. 8A, 1938, pages 208–13.

Zimmerman et al. in "Contr. Boyce Thompson Inst.," Vol. 16, January-March 1952, page 423.

Miur et al. in "Chemical Absts.," Vol. 47, (1953), column 9435 g.

Wagner and Zook, "Synthetic Organic Chemistry," publ. by J. Wiley and Sons, New York 1953, pages 228 and 229.

King: "Insecticides and Repellants," Agricultural Handbook, No. 69, issued May 1954, pages 50 and 77.

Shirley et al. in "Jr. Org. Chem.," Vol. 22, No. 5, May 1957, page 496.